(12) United States Patent
Clementi et al.

(10) Patent No.: US 10,937,008 B2
(45) Date of Patent: *Mar. 2, 2021

(54) CROSS BORDER IMAGE EXCHANGE

(71) Applicant: Bank of America Corporation, Charlotte, NC (US)

(72) Inventors: James Joseph Clementi, Charlotte, NC (US); Clarence Edward Lee, II, Mansfield, TX (US); Michael Greig Stoll, Crestwood, MO (US); Verlon Safold Watson, III, Charlotte, NC (US); Melanie Woodworth, Newport Beach, CA (US); Mary Jo Stuart, Cornelius, NC (US); Ronald E. Meharg, Alpharetta, GA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/733,626

(22) Filed: Jan. 3, 2020

(65) Prior Publication Data

US 2020/0143335 A1 May 7, 2020

Related U.S. Application Data

(63) Continuation of application No. 14/274,187, filed on May 9, 2014, now Pat. No. 10,579,972.

(60) Provisional application No. 61/953,161, filed on Mar. 14, 2014.

(51) Int. Cl.
G06Q 40/00 (2012.01)
G06Q 20/04 (2012.01)
G06Q 20/38 (2012.01)

(52) U.S. Cl.
CPC ........ G06Q 20/042 (2013.01); G06Q 20/381 (2013.01)

(58) Field of Classification Search
CPC ..................................................... G06Q 40/00
USPC .......................................................... 705/45
See application file for complete search history.

(56) References Cited

U.S. PATENT DOCUMENTS 7,578,434 B2 * 8/2009 Hansen .................. G06Q 20/00
235/379

* cited by examiner

*Primary Examiner* — Ojo O Oyebisi
(74) *Attorney, Agent, or Firm* — Michael A. Springs

(57) ABSTRACT

In some embodiments, one or more processors receive a financial instrument via an interface. The financial instrument indicates attributes of a financial transaction. The processors determine, based on one or more of the attributes, whether the financial transaction involves a cross border exchange. If the financial transaction involves a cross border exchange, the processors flag the financial instrument accordingly, perform a currency conversion, and communicate an electronic image associated with the financial instrument to computing resources configured to complete the financial transaction electronically without having to transport a paper copy of the financial instrument between financial institutions.

20 Claims, 4 Drawing Sheets

FIG. 3

Check A
Name of Company
Street Address
City, State
Date: _____
Pay to the Order of _____ $ 10.00
_____ Dollars
Memo _____
XXX-XXX-XXX   XXXX-XXXX-XXXX

310A

Check B
Name of Company
Street Address
City, State
Date: _____
Pay to the Order of _____ $ 5.00
_____ Dollars
Memo _____
XXX-XXX-XXX   XXXX-XXXX-XXXX

310B

| Check ID | Payor Account | Payee Account | Transaction Date | Bank A Currency | Bank B Currency | Exchange Rate |
|---|---|---|---|---|---|---|
| A | Bank B-Account X | Bank A-Account Z | 1/1/2014 | $10.00 | $12.00 | 1.20 |
| B | Bank B-Account Y | Bank A-Account N | 1/1/2014 | $5.00 | $6.00 | 1.20 |
| C | Bank B-Account P | Bank A-Account Q | 1/1/2014 | $50000.00 | $62500.00 | 1.25 |

320

From: Bank A
To: Bank B
Transaction 1 - Check A
Transaction 2 - Check B
Transaction 3 - Check C

330

300

DEPOSIT CONFIRMATION

Depositor Information

Depositor Name: Customer A
Depositing Account #: XXXX-XXXX-9999

TRANSACTION DETAIL

| | Item Count | Total Face Value Amount | Currency Type | FXRate | Deposit Amount |
|---|---|---|---|---|---|
| Common Checks | 2 | 350 | N/A | N/A | $ 350.00 |
| Foreign Exchange - Eligible Checks | 1 | 100 | CSD→USD | 0.90 | $ 90.00 |
| TOTAL DEPOSIT | 3 | | | | $ 440.00 |

CANCEL  OK

*FIG. 4*

CROSS BORDER IMAGE EXCHANGE

CROSS-REFERENCE TO RELATED APPLICATIONS

This application is a continuation of U.S. patent application Ser. No. 14/274,187 filed May 9, 2014, by James Joseph Clementi et al., and entitled "CROSS BORDER IMAGE EXCHANGE," which this application claims the benefit of U.S. Provisional Patent Application No. 61/953,161 filed on Mar. 14, 2014, by James Joseph Clementi et al., and entitled "CROSS BORDER IMAGE EXCHANGE," which are incorporated herein by reference.

TECHNICAL FIELD

The present invention relates generally to the field of transaction processing and more particularly to a cross border image exchange.

BACKGROUND

Certain financial transactions may involve cross border processing. As an example, a payor may have a checking account in Canada. The payor may write a check to a payee in the United States. The payee may present the check to a bank in the United States for payment. To draw funds from the payor's checking account in Canada, the bank in United States may receive the paper check, sort and process the paper check, and send the paper check to the bank in Canada for clearing. Currency conversion is performed on the back end. Thus, after the bank in Canada receives and sorts the paper check, the paper check is manually processed, which includes manually stamping the check with the exchange value.

SUMMARY

In some embodiments, one or more processors receive a financial instrument via an interface. The financial instrument indicates attributes of a financial transaction. The processors determine, based on one or more of the attributes, whether the financial transaction involves a cross border exchange. If the financial transaction involves a cross border exchange, the processors flag the financial instrument accordingly, perform a currency conversion, and communicate an electronic image associated with the financial instrument to computing resources configured to complete the financial transaction electronically without having to transport a paper copy of the financial instrument between financial institutions.

Certain embodiments of the invention may provide one or more technical advantages. A technical advantage of one embodiment may provide a more streamlined and efficient cross border financial instrument processing system. Certain embodiments may facilitate the posting of payments across borders within a shorter time period. Another technical advantage of an embodiment may be to perform a currency conversion at the front end of a cross border check transaction, which may allow for applying a more accurate exchange rate to the transaction and/or may reduce exposure to exchange rate fluctuation. The currency conversion may provide currency information for each jurisdiction. For example, in a transaction between a financial institution in the United States and a financial institution in Canada, the currency information may be provided in U.S. dollars and Canadian dollars. Certain embodiments may provide an end-to-end solution for sending and receiving electronic images of financial instruments (e.g., checks) across borders. The end-to-end solution may process an electronic image of the financial instrument and may include currency conversion and/or other steps customized to cross border applications.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 illustrates an example of output from an image processing module; and FIG. 4 illustrates an example of a deposit confirmation.

DETAILED DESCRIPTION OF THE DRAWINGS

Figure 1:
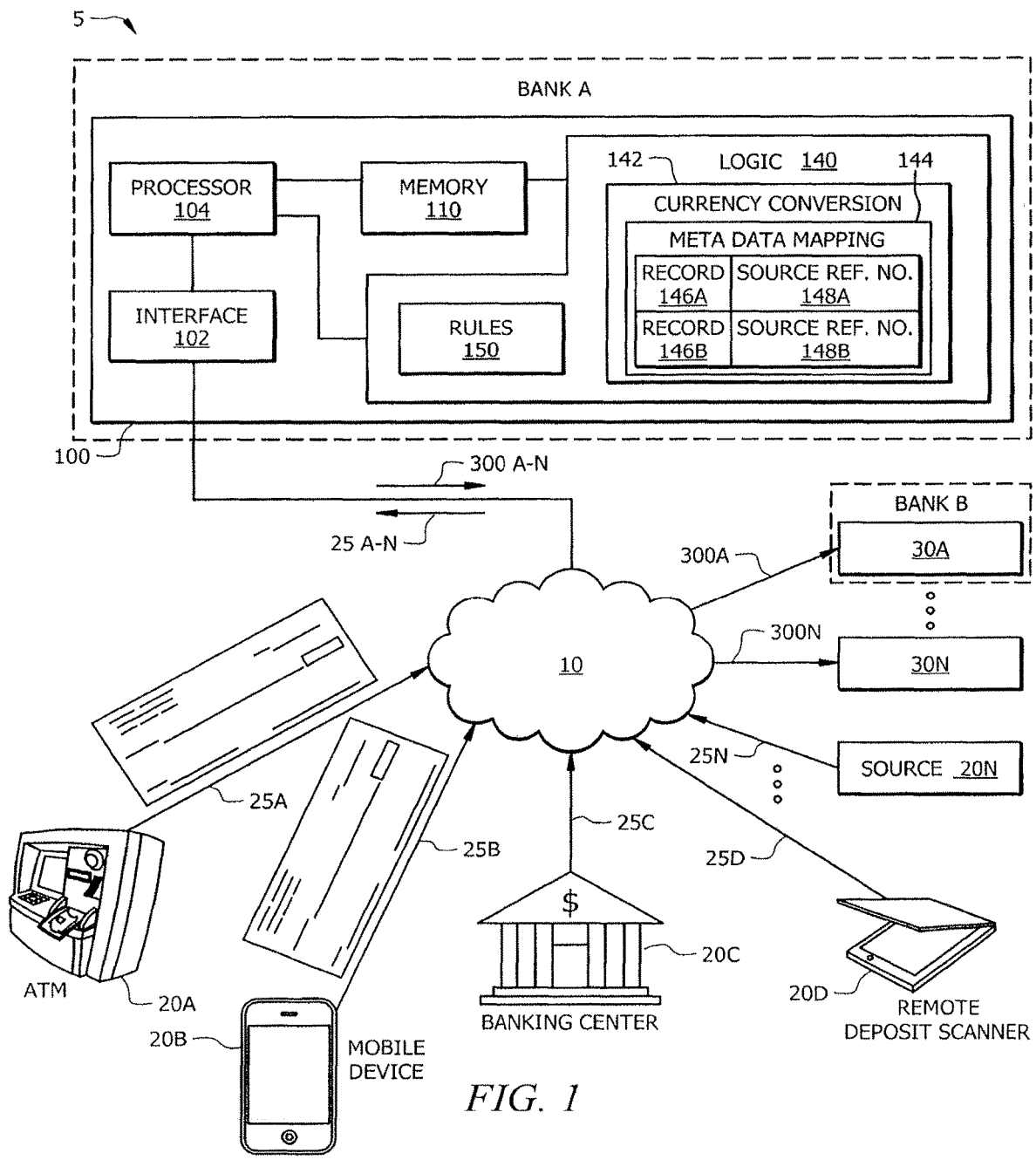
FIG. 1 illustrates an example of a system that facilitates cross border image processing of a financial instrument.

Certain embodiments provide functionality for inbound and/or outbound financial instrument processing with cross border financial institutions. As an example, certain embodiments may provide functionality for inbound and/or outbound cash letter clearing across the U.S.-Canadian border. The functionality may allow for clearing a check drawn on a Canadian bank via an electronic image of the check and/or an electronic image of a cash letter. Clearing the check using the electronic image may accelerate clearing speed (float) for customers and clients. Certain embodiments may reduce financial risk exposure due to exchange rate fluctuations and reduce transportation costs associated with mailing paper checks across borders.

Particular embodiments may enable receipt of Canadian checks as images through various capture channels, perform necessary quality review through an on-screen user interface, and transmit image cash letters for clearing with partner banks. Processing checks as images may provide efficiencies over the current paper-driven method of clearing checks drawn on Canadian financial institutions. The paper-driven method requires physical transportation of checks, which can be costly. For example, in the paper-driven method, paper checks are sent daily from Banking Centers/Cash Vaults to internal Check Storage Sites for sorting. The sorted checks are then sent to Operations Centers for processing. After processing, the Operations Centers sends the checks via express mail or air courier service to Canadian Partner Banks.

Particular embodiments provide an end-to-end capability to exchange image cash letters between cross border financial institutions. As an example, a U.S. bank may send and receive Canadian items (in both United States Dollars (USD) and Canadian Dollars (CAD)) as image cash letters. An image of a check may enter the processing channel from any suitable source, such as a Banking Center, Cash Vault, Lockbox, mobile application, online application, etc. The processing channel may receive the image of the check and send it downstream for clearing. A currency conversion service may be invoked on the front end when the check (whether image or paper) is introduced into the process.

Particular embodiments may provide capabilities to send and receive Canadian item data and images (in both USD and CAD). This may enable the Canadian Items to be sent to Canadian partner banks and processed downstream for clearing. Canadian checks may be received from clients/customers and sent downstream (via cross border image exchange) to their home institution in Canada for clearing. The image may provide the check value in both U.S. dollars and Canadian dollars. The cross border image exchange may eliminate the transportation cost as well as transportation time and other potential delivery delays associated with conventional paper driven methods used in cross border transactions.

Particular embodiments are described with respect to the following figures, like numerals being used like and corresponding portions of the various figures.

FIG. 1 illustrates an example system 5 that facilitates financial transactions using a cross border image exchange. As an example, one of the financial transactions may be transacted between a first financial institution, Bank A, and a second financial institution, Bank B. In some embodiments, a customer of Bank A presents a financial instrument to Bank A. The financial instrument may be a money order, a cash letter, a check, or other instrument that indicates attributes of the financial transaction. Examples of attributes include the monetary amount (e.g., $5.00, $10.00, $20.00, or other monetary amount), the transaction currency type (e.g., Canadian dollars, U.S. dollars, Euros, or other currency type), a drawee financial account from which the funds are to be withdrawn (e.g., account no. xxxx), and a drawee financial institution (e.g., Bank B that maintains account no. xxxx), a payee financial account to which funds are to be deposited (e.g., account no. yyyy), and a payee financial institution that maintains the payee financial account (e.g., Bank A that maintains account no. yyyy). Financial instrument may indicate attributes of the financial transaction explicitly (attributes may be written on the financial instrument) and/or implicitly (attributes may be associated with the financial instrument, for example, using a reference number that links to related metadata). In some embodiments, Bank A processes the financial instrument and requests Bank B to pay the corresponding monetary amount. Bank B completes the financial transaction by paying the monetary amount to Bank A.

In some embodiments, Bank A may be associated with an image processing module 100. Image processing module 100 allows for completing the financial transaction by exchanging a photograph, a scan, or other electronic image. Thus, Bank A can send Bank B images of financial instruments, rather than printed paper versions of the financial instruments, and Bank B can make payments to Bank A based on the images.

Bank A's image processing module 100 may receive an image 25 of the financial instrument from a source 20 via network 10. An image 25 may refer to an electronic file that depicts one or more financial instruments, such as checks, cash letters, money orders, or other documents related to or evidencing one or more transactions. Examples of sources 20 include laptops, personal computers, monitors, display devices, handheld devices, smartphones, servers, user input devices, ATMs, and any other devices capable of sending image 25 to image processing module 100. Source 20 may receive financial instruments in image form and/or in paper form. Source 20 may convert the financial instrument into a format that can be communicated to image processing module 100. For example, source 20 can convert a paper financial instrument into an image 25 having a file type supported by image processing module 100.

Each source 20 may be associated with a banking center, a cash vault, an online banking application, a mobile banking application, or other means through which a financial institution processes checks and/or other financial instruments on behalf of customers. As an example, a user may deposit a check at an ATM machine (source 20A), which then produces an image file 25A containing a visual representation of the check. The ATM may send that image file 25A and, optionally, data associated with the image file 25A to image processing module 100. In another example, a user seeking to deposit a check may use a smart phone (source 20B) to scan or photograph an image file 25B depicting the check and send the image file to image processing module 100 via a mobile banking application. Other examples of sources 20 include a source 20C located in a banking center, a remote deposit scanner 20D, or other suitable source 20N. In some embodiments, any two or more different types of sources 20 may communicate with image processing module 100 concurrently.

Certain sources 20 may correspond to Bank A (the payee financial institution in the example). For example, source 20 could be a computer within a banking center of Bank A or source 20 could be an online banking application provided by Bank A. Other sources 20 may correspond to direct send customers of Bank A. For example, Corporation B may be a customer of Bank A that interfaces with Bank A through a direct send system. Other sources 20 may correspond to other financial institutions. For example, Bank C may send images 25 of financial instruments to Bank A's image processing module 100.

Image processing module 100 receives the image 25 of the financial instrument from source 20, determines attributes associated with the financial instrument, and performs processing to facilitate clearing the financial instrument. For example, image processing module 100 may determine that the financial instrument received by the first financial institution (e.g., Bank A) is drawn on a second financial institution (e.g., Bank B). In some embodiments, image processing module 100 then determines if the first financial institution and second financial institution belong to different jurisdictions.

Suppose that image processing module 100 determines that the first financial institution belongs to one jurisdiction (e.g., Bank A is bank in the United States) and the second financial institution belongs to a different jurisdiction (e.g., Bank B is a bank in Canada). In response to this determination, image processing module 100 may perform steps for cross border image processing. As an example, image processing module 100 may perform a currency conversion based on the current exchange rate between the first jurisdiction (e.g., U.S.) and the second jurisdiction (e.g., Canada). Image processing module 100 may determine the monetary amount of the financial instrument in the currency of each jurisdiction (e.g., U.S. dollars and Canadian dollars). Image processing module 100 generates output 300, such as image 25 of the financial instrument and/or an image of a corresponding cash letter. Output 300 may further include the currency conversion information or other data. An example of output 300 is illustrated and described with respect to FIG. 3 below.

Image processing module 100 sends output 300 directly or indirectly to downstream equipment 30 via network 10. Downstream equipment 30 includes computing resources associated with the second financial institution (Bank B in the example). These computing resources process the image on behalf of the second financial institution in order to clear the financial instrument and complete the financial transaction. Downstream equipment 30 may include one or more laptops, personal computers, monitors, display devices, handheld devices, smartphones, servers, user input devices, or other suitable components for enabling user input. System 5 may include any suitable number and type of downstream equipment 30. For example, downstream equipment 30A may handle transactions with Bank B in Canada, downstream equipment 30B may handle transactions with a different bank or clearing house in Canada, downstream equipment 30C may handle transactions with a bank in another country, and so on.

Image processing module 100 represents any suitable components that facilitate the processing of images in system 5. Image processing module 100 may include a network server, remote server, mainframe, host computer, workstation, web server, personal computer, file server, or any other suitable device operable to communicate with sources 20 and process data. In some embodiments, image processing module 100 may execute any suitable operating system such as IBM's zSeries/Operating System (z/OS), MS-DOS, PC-DOS, MAC-OS, WINDOWS, UNIX, OpenVMS, Linux or any other appropriate operating systems, including future operating systems. The functions of image processing module 100 may be performed by any suitable combination of one or more servers or other components at one or more locations. In the embodiment where the modules are servers, the servers may be public or private servers, and each server may be a virtual or physical server. The server may include one or more servers at the same or at remote locations. Also, image processing module 100 may include any suitable component that functions as a server.

In the illustrated embodiment, image processing module 100 includes network interface 102, processor 104, memory 110, and logic 140. Processor 104 may be communicatively coupled to network interface 102, memory 110, and logic 140. Network interface 102 represents any suitable device operable to receive information from network 10, transmit information through network 10, perform suitable processing of the information, communicate to other devices, or any combination of the preceding. For example, network interface 102 receives from sources 20 images 25 and/or data associated with payments. As another example, network interface 102 communicates output 300 to downstream equipment 30 to facilitate completing the financial transactions indicated by the financial instrument image(s) included in output 300. Network interface 102 represents any port or connection, real or virtual, including any suitable hardware and/or software, including protocol conversion and data processing capabilities, to communicate through a LAN, WAN, or other communication system that allows image processing module 100 to exchange information with network 10, sources 20, downstream equipment 30, other image processing modules 100 (or other components of image processing module 100), or other components of system 5.

Processor 104 communicatively couples to network interface 102 and memory 110, and controls the operation and administration of image processing module 100 by processing information received from network interface 102 and memory 110. Processor 104 includes any hardware and/or software that operates to control and process information. For example, processor 104 executes logic 140 to control the operation of image processing module 100. Processor 104 may comprise a programmable logic device, a microcontroller, a microprocessor, any suitable processing device, or any suitable combination of the preceding.

Memory 110 stores, either permanently or temporarily, data, operational software, or other information for processor 104, other components of image processing module 100, or other components of system 5. Memory 110 includes any one or a combination of volatile or nonvolatile local or remote devices suitable for storing information. For example, memory 110 may include random access memory (RAM), read only memory (ROM), flash memory, magnetic storage devices, optical storage devices, network storage devices, cloud storage devices, or any other suitable information storage device or a combination of these devices. While illustrated as including particular modules, memory 110 may include any suitable information for use in the operation of image processing module 100.

In some embodiments, logic 140 represents any suitable set of instructions, logic, or code embodied in a computer-readable storage medium and operable to facilitate the operation of image processing module 100. For example, logic 140 executes instructions to generate output from input. Logic may include hardware, software, and/or other logic. Logic 140 may be encoded in one or more non-transitory, tangible media, such as a computer readable medium or any other suitable tangible medium. As an example, logic 140 may be stored in memory 110 or another memory associated with image processing module 100. Logic 140, or portions thereof, may also be embodied in hardware associated with image processing module 100 or other components of system 5. Furthermore, the components of logic 140 may be stored in the same or different memories of the same or different image processing modules 100. Components of logic 140 may also be stored in different components of system 5.

Logic 140 may perform operations and/or manage the operation of a component when executed by a processor, such as a computer. Logic 140 may include currency conversion service 142 and one or more image processing rules 150. Currency conversion service 142 and image processing rules 150 may represent any suitable set of instructions, logic, or code embodied in a computer-readable storage medium and operable to facilitate the operations of image processing module 100. In some embodiments, image processing module 100 may evaluate an image file according to rules 150 to determine whether to apply cross border image processing to a financial instrument. Upon a determination to apply cross border image processing to the financial instrument, rules 150 may invoke currency conversion service 142.

Currency conversion service 142 may perform a currency conversion based on a current exchange rate. As an example, suppose that the financial instrument requires Bank A in a first jurisdiction (e.g., U.S.) to draw on Bank B in a second jurisdiction (e.g., Canada). Currency conversion service 142 may convert the monetary amount according to the current U.S. dollar/Canadian dollar exchange rate. Currency conversion service 142 may perform the currency conversion at the front end of financial instrument processing. Thus, currency conversion service 142 may perform the currency conversion when Bank A processes the financial instrument and before sending output 300 to Bank B. Thus, output 300 sent to Bank B may include currency conversion information, such as the U.S. dollar amount, the Canadian dollar amount, and the exchange rate that was applied.

In some embodiments, currency conversion service 142 determines the current exchange rate based on a plurality of factors. Examples of factors include a market exchange rate, the customer's relationship with the bank, and the monetary amount of the financial transaction. In some embodiments, the market exchange rate may be used as a starting point for the current exchange rate, and adjustments can be made according to a tier system. The tier system may provide the financial transaction with a better exchange rate if the financial transaction is associated with a customer that has a preferred relationship with Bank A. The customer's relationship can be evaluated based on the length of the relationship, the number or frequency of the customer's transactions with Bank A and/or the aggregate monetary value of the customer's transactions with Bank A over a period of time, aggregate monetary balances in financial accounts that the customer holds with Bank A, the absence of risk factors associated with the customer, and/or other suitable criteria.

In addition (or in the alternative) the tier system may provide the financial transaction with a better exchange rate if the monetary amount is relatively high. For example, a tier A exchange rate could be applied to monetary amounts less than $50, a tier B exchange rate could be applied to monetary amounts from $50 and $99, a tier C exchange rate could be applied to monetary amounts from $100 to $499, and a tier D exchange rate could be applied to monetary amounts greater than or equal to $500. In the example, the tier D exchange rate may be better than the tier C exchange rate, the tier C exchange rate may be better than the tier B exchange rate, and the tier B exchange rate may be better than the tier A exchange rate.

In some embodiments, currency conversion service 142 includes a meta data mapping module 144. Meta data mapping module 144 may generate and store a record 146 comprising meta data associated with the financial transaction. Meta data mapping module 144 may assign a source reference number 148 that is used to locate the corresponding record 146. Source reference number 148 may be assigned prior to communicating output 300 to Bank B (via downstream equipment 30).

In conventional, paper-driven contexts, information associated with a financial transaction is typically tracked using a posting number that the drawee financial institution (e.g., Bank B) assigns at the end of the process when the financial transaction is posted. Embodiments of the present invention assign source reference number 148 earlier in the process. For example, source reference number 148 can be assigned prior to sending output 300 to the drawee financial institution and prior to posting the payment. Assigning source reference number 148 early allows for tracking information generated before communicating output 300 to the drawee financial institution. For example, currency conversion information can be mapped to source reference number 148 at the time that the currency conversion is performed. Any relevant information can be mapped to source reference number 148, including image 25 of the financial instrument or information generated later in the process, such as a posting record for the financial transaction.

In addition to source reference number 148, certain embodiments cross-reference record 146 according to other identifiers, such as a sequence number that source 20 generates upon receipt of a financial instrument and/or a posting number that the drawee financial institution generates when the financial transaction posts. The various cross-references may be added to record 146 as they become available. Thus, record 146 may be referenced by source reference number 148 before communicating output 300 to the drawee financial institution and the posting number could be added at a later time (after communicating output 300 to the drawee financial institution).

Each of source 20, image processing module 100, and downstream equipment 30 may optionally include a display that presents information to a user via a graphical user interface ("GUI"). The GUI may allow the user to manually evaluate the information and provide input. For example, source 20 may provide a GUI that allows a user to enter an image of a financial instrument into system 5. As another example, image processing module 100 may include a GUI that allows a user, such as a bank employee, to view information associated with images processed by image processing module 100. As an example, the GUI may allow the bank employee to view the image files themselves or summaries/statistics, such as the number of images processed, the results of currency conversion, the number of cross border transactions, the jurisdictions involved in cross border transactions, or other suitable information. FIG. 4 below illustrates an example of a deposit confirmation that could be displayed on a GUI.

As indicated above, sources 20, downstream equipment 30, and image processing module 100 may be communicatively coupled by network 10. Network 10 represents any suitable network operable to facilitate communication between the components of system 5. Network 10 may include any interconnecting system capable of transmitting audio, video, signals, data, messages, or any combination of the preceding. Network 10 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

Modifications, additions, or omissions may be made to system 5 without departing from the scope of the invention. For example, system 5 may implement image processing procedures different from or in addition to those described herein. As another example, multiple image processing modules 100 may operate in parallel to facilitate image processing. As yet another example, image processing rules 150 may be configurable by a user (such as a bank employee) of image processing module 100. For example, the user may add, delete, or modify rules 150. System 5 may include any number of sources 20, networks 10, image processing modules 100, and downstream equipment 30. Any suitable logic may perform the functions of system 5 and the components within system 5. Although certain examples have been described in the context of check processing, components of system 5 may process other types of financial instruments, such as cash letters. Although certain examples have described image processing module 100 as being associated with a payee financial institution (e.g., Bank A), in other embodiments image processing module 100 may be associated with a drawee financial institution (e.g., Bank B).

Figure 2:
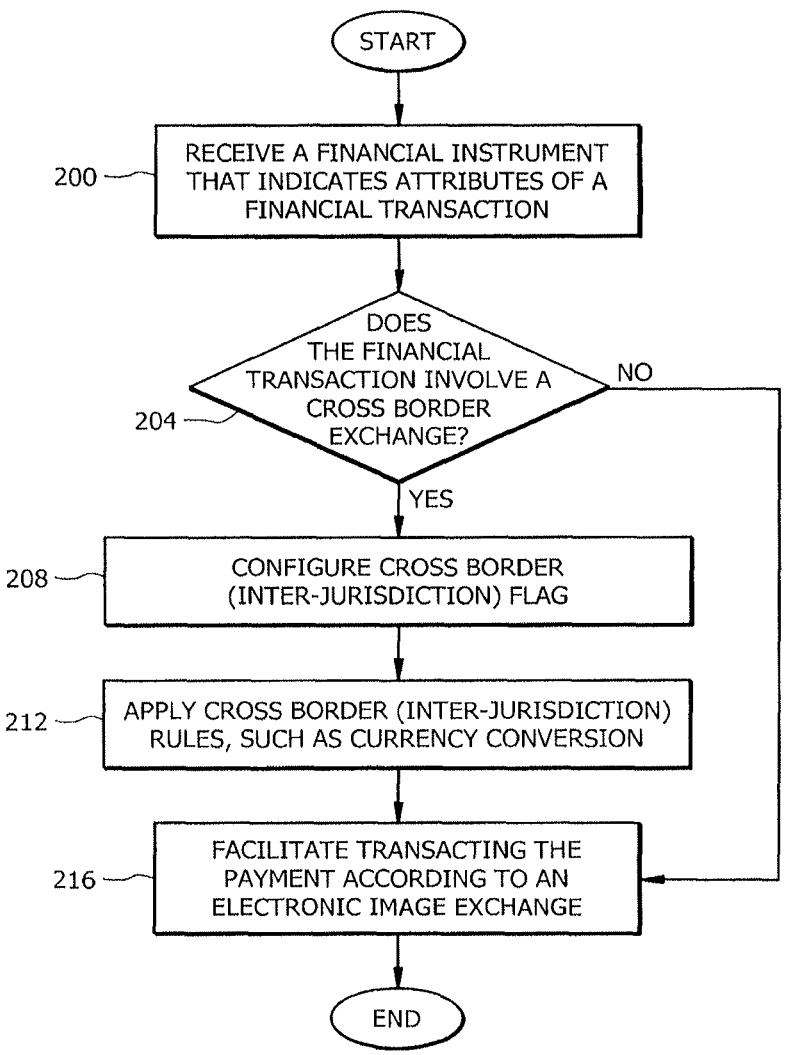
FIG. 2 illustrates an example of a method for cross border image processing of a financial instrument.

FIG. 2 illustrates an example of a method that may be performed by image processing module 100 to facilitate processing a financial instrument in order to transfer funds from a drawee financial institution to a payee financial institution according to information contained in a financial instrument. As an example, the method may facilitate processing a check in order to transfer funds from a payor's checking account (at the drawee financial institution) to a payee's bank account (at the payee financial institution).

At step 200, image processing module 100 associated with a first financial institution receives a financial instrument. In some embodiments, the first financial institution may correspond to the financial institution that provides the payee financial account. A financial instrument may refer to any suitable written instrument that initiates withdrawing funds (a payment) from the drawee financial institution and depositing the funds with the payee financial institution.

The financial instrument indicates attributes of the financial transaction. Examples of attributes include the monetary amount (e.g., $5.00, $10.00, $20.00, or other monetary amount), the transaction currency type (e.g., Canadian dollars, U.S. dollars, Euros, or other currency type), a drawee financial account from which the funds are to be withdrawn (e.g., account no. xxxx), a drawee financial institution (e.g., Bank B that maintains account no. xxxx), a payee financial account to which funds are to be deposited (e.g., account no. yyyy), and a payee financial institution that maintains the payee financial account (e.g., Bank A that maintains account no. yyyy). Certain attributes could be written on the face of the financial instrument, and other attributes could be linked to the financial instrument using a metadata. For example, when a customer deposits a check into a payee financial account, a sequence number may be generated to store metadata associating the written instrument to the payee financial account.

In some embodiments, the financial instrument may be a money order, a cash letter, or a check, such as a personal check, a traveler's check, a cashier's check, a certified check, etc. Examples of attributes of a check include a monetary amount, a payee, and a signature that authorizes payment to the payee for the stated monetary amount. Attributes of the check may also include an account number corresponding to the drawee financial account and routing information (or similar information) indicating the drawee financial institution associated with the drawee financial account. Transacting the check may cause the drawee financial institution to debit the monetary amount from the drawee financial account and credit the monetary amount to the payee financial institution (e.g., where the payee's bank account may be credited).

In some embodiments, the financial instrument may be a cash letter that lists a number of transactions between the drawee financial institution and the payee financial institution. As an example, a cash letter may list checks that customers of the payor financial institution have written to customers of the payee financial institution during a given time period. The time period could be a number of minutes, a number of hours, a day, or other suitable time period. Each check could be listed with one or more corresponding attributes, such as the monetary amount of the check.

Image processing module 100 may receive the financial instrument from source 20 in the form of an electronic image 25. The electronic image 25 may depict the financial instrument. Image processing module 100 may receive the image from any suitable source 20. As an example, the payee may capture an image of the check using a camera or scanner on a mobile device. The mobile device may transmit the image to the payee's financial institution via a mobile banking application. As another example, the payee may provide a paper check to an ATM, and the ATM may include a camera or scanner that generates the image of the check and forwards the image to image processing module 100. As another example, the payee may provide a paper check to a teller at a banking center, and the banking center may use a scanner or other device to generate the image of the check. As another example, the payee may be a corporate customer that sends financial instruments to the payee financial institution through a direct send system. In some embodiments, image processing module 100 may receive images for a number of checks, determine the checks that will be drawn on the same drawee financial institution, and generate an image of a cash letter listing the checks that will be drawn on the same drawee financial institution.

At step 204, image processing module 100 determines, based on one or more of the attributes of the financial instrument, whether the financial transaction involves a cross border exchange. A cross border exchange occurs in financial transactions between two different jurisdictions, such as financial transactions between the United States and Canada. Image processing module 100 may determine that the financial transaction involves the cross border exchange in any suitable manner. As an example, an image processing module 100 associated with a financial institution in the United States may determine that the transaction involves the cross border exchange based on one the presence of one or more of the following conditions: a financial instrument in a Canadian dollar amount, a Canadian dollar financial account, a Canadian routing transaction number (RTN), or a cross currency financial instrument based on deposit account (e.g., a U.S. dollar item drawn from a U.S. financial account for deposit in a Canadian dollar item account). The presence of the conditions may be determined based on Magnetic Ink Character Recognition (MICR) data of the financial instrument and/or based on profile information for the financial account or the financial institution. Various examples are described in more detail below.

As a first example, image processing module 100 may determine that the financial transaction involves the cross border exchange if a transaction currency type differs from the payee financial institution's currency type or the drawee financial institution's currency type. In some embodiments, the transaction currency type can be determined from the financial instrument. For example, if check X specifies its monetary amount in Canadian dollars, the transaction currency type would be Canadian dollars. If check Y specifies its monetary amount in U.S. dollars, the transaction currency type would be U.S. dollars.

The transaction currency type can be compared to the currency type used by a financial institutions transacting the financial instrument. For example, suppose that Bank A is the payee financial institution, resides within the jurisdiction of the United States, and has a currency type of U.S. dollars. If Bank A transacts check X, image processing module 100 would determine that the financial transaction involves a cross border exchange, and the cross border image exchange would include a currency conversion from Canadian dollars to U.S. dollars. If Bank A transacts check Y, the financial transaction may or may not involve a cross border exchange depending on whether the drawee financial institution's currency type is U.S. dollars. That is, if each of the transaction currency type, the payee financial institution's currency type, and the drawee financial institution's currency type corresponds to U.S. dollars, image processing module 100 may determine that a cross border image exchange is not needed.

As a second example, image processing module 100 may determine that the financial transaction involves the cross border exchange if the payee financial account resides in one jurisdiction and the drawee financial account resides in another jurisdiction. In some embodiments, the payee and drawee financial accounts may be considered to be in different jurisdictions if they are domiciled in different countries. In some embodiments, the financial accounts may be considered to be in different jurisdictions if the payee and drawee financial accounts use different currency types. For example, if a profile associated with the payee financial account indicates that the payee financial account uses U.S. dollars and a profile associated with the drawee financial account indicates that the drawee financial account uses Canadian dollars, the financial accounts would be considered to reside in different jurisdictions for the purposes of the cross border exchange analysis. In other words, a financial account that does not use the currency type associated with a particular jurisdiction may be considered to reside outside of that jurisdiction.

As a third example, image processing module 100 may determine that the financial transaction involves a cross border exchange if the payee financial institution resides in one jurisdiction and the drawee financial institution resides in another jurisdiction. For example, in some embodiments, an image processing module 100 associated with the payee financial institution may determine the drawee financial institution based on a routing transaction number (RTN) or similar information read from the image of the financial instrument. Or, image processing module may determine the drawee financial institution based on an indicator associated with the financial instrument, such as a parameter set by a sorting system that sorts financial instruments prior to receipt by image processing module 100. Image processing module 100 may use the RTN, the indicator, or other information to determine a drawee jurisdiction associated with the drawee financial institution and may invoke a cross border process if the drawee jurisdiction is different from the jurisdiction associated with the payee financial institution.

Financial institutions in the same jurisdiction may use the same currency and may be subject to the same regulations with respect to financial transactions. As an example, if both financial institutions are in the United States, they may both use U.S. dollars and be subject to U.S. law. Financial institutions in different jurisdictions may use different currencies and/or may be subject to different regulations with respect to financial transactions. As an example, if the first financial institution is organized in the United States and the second financial institution is organized in another jurisdiction, such as Canada, the jurisdictions may be different. That is, financial institutions in different countries could be considered to be in different jurisdictions in some cases. Similarly, in some cases, financial institutions in different states or different economic zones could potentially be considered to be in different jurisdictions (e.g., if different currencies are used or if different regulations apply with respect to financial transactions).

If at step 204 image processing module determines that the financial transaction involves a cross border exchange, the method proceeds to steps 208-216 to apply a cross border process. If at step 204 image processing module determines that the financial transaction does not involve a cross border exchange, the method skips to step 216.

At step 208, image processing module 100 may optionally configure a flag to indicate that the cross border process applies to the financial instrument. Thus, cross border rules may be applied to financial instruments for which the flag is configured and may not be applied to financial instruments for which the flag is not configured (e.g., financial instruments within the same jurisdiction).

At step 212, image processing module 100 may perform a currency conversion based on a current exchange rate between the first jurisdiction (e.g., the jurisdiction associated with the payee financial institution) and the second jurisdiction (e.g., the jurisdiction associated with the drawee financial institution). The currency conversion may be performed at the front end of processing the financial instrument to minimize the effect of exchange rate fluctuations. That is, rather than waiting to perform the conversion until a paper copy of the financial instrument is sent from the payee financial institution and received by the drawee financial institution, the financial instrument may be handled electronically (in real time) and the currency conversion may be performed up front by the payee institution.

As discussed with respect to FIG. 1 above, the currency conversion may be determined according to a tiered rate based on the monetary amount and/or the customer's relationship with the financial institution. As also discussed with respect to FIG. 1 above, the currency conversion may include a metadata mapping where a source reference number is assigned to the financial instrument prior to communicating the electronic image to the computing resources adapted to post the financial transaction. Thus, currency conversion information or other metadata associated with the financial transaction may be stored in a record and tracked according to the source reference number prior to posting.

In some embodiments, image processing module may perform currency conversion as a web service. The web service may perform a currency calculation and supply rate information. In some embodiments, the web service may support all of the image channels (e.g., different sources 20 for the images). The web service may be able to perform customer-level overrides (instead of the default rate) where appropriate. The web service may generate any suitable outputs. In the example where the payor financial institution is a Canadian bank and the payee institution is a U.S. bank, the web service may output data associated with Canadian checks (such as the dollar amount in Canadian and U.S. dollars), images of the Canadian checks, and images of cash letters that the U.S. bank will draw from the Canadian bank (which may list a number of checking transactions).

In some embodiments, image processing module 100 may apply any other suitable inter-jurisdiction/cross border processes. For example, image processing module 100 may confirm that the transaction meets all the requirements for electronic image transactions in both jurisdictions. Examples of requirements may include data security, privacy, fraud detection, and so on. As an example, image processing module 100 may receive an image of a financial instrument in the U.S. The image may be formatted to meet U.S. data security requirements. However, the image might not meet Canadian data security requirements. If so, image processing module 100 may format the image according to Canadian requirements prior to transmitting the image to the Canadian financial institution.

At step 216, image processing module 100 facilitates completing the financial transaction according to an image exchange. For example, image processing module 100 communicates output 300, including an electronic image associated with the financial instrument, to computing resources configured to complete the financial transaction electronically and independently of transporting a paper copy of the financial instrument (e.g., the original paper financial instrument itself) between the payee financial institution and the drawee financial institution. As an example, to facilitate the payment of a check, an image processing module associated with a payee financial institution may send a drawee financial institution an image of the check, data associated with the check (such as the monetary amount in the currency of the first jurisdiction and the monetary amount in the currency of the second jurisdiction), and/or an image of a cash letter corresponding to the check. The method then ends.

Various embodiments may perform some, all, or none of the steps described above. For example, certain embodiments may omit steps under certain conditions, or they may omit these steps entirely. Furthermore, certain embodiments may perform these steps in different orders. Although the preceding example described a case where image processing module 100 sends withdrawal requests to another financial institution via electronic image, in some embodiments image processing module 100 may receive withdrawal requests from the other financial institution via electronic image. To the extent that the sending financial institution may not have applied cross border processes (such as currency conversion), image processing module 100 may apply the processes after receipt of the withdrawal request.

FIG. 3 illustrates an example output 300 from image processing module 100. For purposes of example and illustration, FIG. 3 illustrates information pertaining to checks. In other embodiments, analogous information could be included for other types of financial instruments. As illustrated in FIG. 3, output 300 includes check images 310, check data 320, and/or cash letter 330. Check images 310 may depict checks that the payee financial institution draws on the drawee financial institution. Check 320 data may provide information describing the checks. As an example, check data 320 could include one or more of a check identifier, a payor account number, a payee account number, a transaction date, a monetary amount in the payee jurisdiction's currency, a corresponding monetary amount in the payor jurisdiction's currency, an exchange rate applied, and/or other data related to the checks 310. Cash letter 330 may include any suitable information, such as a list of transactions that the payee financial institution is requesting of the drawee financial institution.

Different exchange rates can be applied to different financial transactions. For example, image processing module 100 can determine the current exchange rate according to a plurality of factors, such as market exchange rate, customer relationship, and/or the monetary amount of the financial transaction. In FIG. 3, the market exchange rate may be the same for Check A and Check C, for example, if the currency conversion occurs at approximately the same time and the transaction is between the same two jurisdictions. The market exchange rate may be adjusted according to a tier system that takes the monetary amount of the financial transaction into consideration. The tier system may define thresholds at which particular exchange rates are to be applied. In FIG. 3, applying the tier system to Check A yields an exchange rate of 1.2 to due to its relatively low monetary amount of $10.00. Applying the tier system to Check C yields an exchange rate of 1.25 due to its relatively high monetary amount of $50,000.

FIG. 4 illustrates an example of a deposit confirmation screen in an image exchange system. The deposit confirmation screen could be displayed on a GUI associated with any suitable component of system 5. As an example, the deposit confirmation could be displayed to a customer that interacts with a source 20 to transact a financial instrument. As another example, the deposit confirmation could be displayed to a bank employee that operates image processing module 100.

As illustrated in FIG. 4, the depositor, Customer A, has deposited 3 checks into depositing account number XXXX-XXXX-9999. The two common checks did not require currency conversion. A reason for this may be that the deposit account number XXXX-XXXX-9999 and the drawee account associated with the common checks both use the same currency type (e.g., U.S. dollars only). A third check (the foreign exchange-eligible check) illustrates a currency conversion from Canadian dollars to U.S. dollars. Thus, the image exchange system may process financial instruments that invoke a cross border process as well as financial instruments that do not require a cross border process.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set. Modifications, additions, or omissions also may be made to the methods disclosed herein without departing from the scope of the invention. The methods may include more, fewer, or other steps. Additionally, steps may be performed in any suitable order. Although transactions between the United States and Canada have been described for purposes of example, other embodiments may apply to financial transactions involving other jurisdictions.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

The invention claimed is:

1. A system, comprising:
    an interface operable to:
        receive a financial instrument for a financial transaction associated with a payee financial institution and a drawee financial institution;
    one or more processors communicatively coupled to the interface, the one or more processors associated with the payee financial institution and operable to:
        determine, based on one or more of the attributes of the financial instrument, whether the financial transaction involves a cross border exchange from a first jurisdiction to a second jurisdiction, the second jurisdiction different than the first jurisdiction; and
        apply a cross border process in response to determining that the financial transaction involves the cross border exchange, wherein to apply the cross border process, the one or more processors are further operable to communicate an electronic image associated with the financial instrument to computing resources associated with the drawee financial institution that are configured to complete the financial transaction electronically and independently of transporting a paper copy of the financial instrument between the payee financial institution and the drawee financial institution;
        wherein, at the front end of financial instrument processing prior to communicating the electronic image to the computing resources associated with the drawee financial institution that are configured to complete the financial transaction, the one or more processors are further operable to:
            configure a flag to indicate that the cross border process applies to the financial instrument;
            assign a source reference number to the financial instrument;

perform a currency conversion based on a current exchange rate between the first jurisdiction and the second jurisdiction; and map the current exchange rate that was applied during the currency conversion to the source reference number.

2. The system of claim 1, wherein the one or more processors determine that the financial transaction involves the cross border exchange if a transaction currency type differs from the payee financial institution's currency type or the drawee financial institution's currency type.

3. The system of claim 1, wherein the one or more processors determine that the financial transaction involves the cross border exchange if a payee financial account resides in the first jurisdiction and a drawee financial account resides in the second jurisdiction.

4. The system of claim 3, the one or more processors further operable to determine that the drawee financial account does not reside in the first jurisdiction if an account currency type associated with the drawee financial account differs from a first jurisdiction currency type.

5. The system of claim 1, wherein the one or more processors determine that the financial transaction involves a cross border exchange if the payee financial institution resides in the first jurisdiction and the drawee financial institution resides in the second jurisdiction.

6. The system of claim 1, wherein the current exchange rate is determined according to a plurality of factors and one of the factors corresponds to the monetary amount of the financial transaction.

7. The system of claim 1, wherein the cross border process further comprises determining data security, privacy, and/or fraud detection requirements associated with the jurisdiction of the drawee financial institution and formatting the electronic image according to the requirements.

8. A non-transitory computer readable storage medium comprising logic, the logic, when executed by a processor, operable to:

receive a financial instrument for a financial transaction associated with a payee financial institution and a drawee financial institution;

determine, based on one or more of the attributes of the financial instrument, whether the financial transaction involves a cross border exchange from a first jurisdiction to a second jurisdiction, the second jurisdiction different than the first jurisdiction; and apply a cross border process in response to determining that the financial transaction involves the cross border exchange, wherein to apply the cross border process, the logic is further operable to communicate an electronic image associated with the financial instrument from computing resources associated with the payee financial institution to computing resources associated with the drawee financial institution that are configured to complete the financial transaction electronically and independently of transporting a paper copy of the financial instrument between the payee financial institution and the drawee financial institution;

wherein at the front end of financial instrument processing prior to communicating the electronic image to the computing resources associated with the drawee financial institution that are configured to complete the financial transaction, the logic is further operable to:

configure a flag to indicate that the cross border process applies to the financial instrument;

assign a source reference number to the financial instrument;

perform a currency conversion based on a current exchange rate between the first jurisdiction and the second jurisdiction; and map the current exchange rate that was applied during the currency conversion to the source reference number.

9. The computer readable storage medium of claim 8, wherein the logic determines that the financial transaction involves the cross border exchange if a transaction currency type differs from the payee financial institution's currency type or the drawee financial institution's currency type.

10. The computer readable storage medium of claim 8, wherein the logic determines that the financial transaction involves the cross border exchange if a payee financial account resides in the first jurisdiction and a drawee financial account resides in the second jurisdiction.

11. The computer readable storage medium of claim 10, wherein the logic determines that the drawee financial account does not reside in the first jurisdiction if an account currency type associated with the drawee financial account differs from a first jurisdiction currency type.

12. The computer readable storage medium of claim 8, wherein the logic determines that the financial transaction involves a cross border exchange if the payee financial institution resides in the first jurisdiction and the drawee financial institution resides in the second jurisdiction.

13. The computer readable storage medium of claim 8, wherein the logic determines the current exchange rate according a plurality of factors and one of the factors corresponds to the monetary amount of the financial transaction.

14. The computer readable storage medium of claim 8, wherein the cross border process further comprises determining data security, privacy, and/or fraud detection requirements associated with the jurisdiction of the drawee financial institution and formatting the electronic image according to the requirements.

15. A method executed by a processor, the method comprising:

receiving a financial instrument for a financial transaction associated with a payee financial institution and a drawee financial institution;

determining, based on one or more of the attributes of the financial instrument, whether the financial transaction involves a cross border exchange from a first jurisdiction to a second jurisdiction, the second jurisdiction different than the first jurisdiction; and applying a cross border process in response to determining that the financial transaction involves the cross border exchange, wherein applying the cross border process comprises communicating an electronic image associated with the financial instrument from computing resources associated with the payee financial institution to computing resources associated with the drawee financial institution that are configured to complete the financial transaction electronically and independently of transporting a paper copy of the financial instrument between the payee financial institution and the drawee financial institution:

wherein at the front end of financial instrument processing prior to communicating the electronic image to the computing resources associated with the drawee financial institution that are configured to complete the financial transaction, the method further comprises:

configuring a flag to indicate that the cross border process applies to the financial instrument;

assigning a source reference number to the financial instrument;

performing a currency conversion based on a current exchange rate between the first jurisdiction and the second jurisdiction; and mapping the current exchange rate that was applied during the currency conversion to the source reference number.

16. The method of claim 15, wherein the method determines that the financial transaction involves the cross border exchange if a transaction currency type differs from the payee financial institution's currency type or the drawee financial institution's currency type.

17. The method of claim 15, wherein the method determines that the financial transaction involves the cross border exchange if a payee financial account resides in the first jurisdiction and a drawee financial account resides in the second jurisdiction.

18. The method of claim 17, wherein the method determines that the drawee financial account does not reside in the first jurisdiction if an account currency type associated with the drawee financial account differs from a first jurisdiction currency type.

19. The method of claim 15, wherein the method determines that the financial transaction involves a cross border exchange if the payee financial institution resides in the first jurisdiction and the drawee financial institution resides in the second jurisdiction.

20. The method of claim 15, wherein the method determines the current exchange rate according a plurality of factors and one of the factors corresponds to the monetary amount of the financial transaction.

\* \* \* \* \*